June 25, 1940.　　W. B. PLUMMER ET AL　　2,205,667
LUBRICATING DEVICE
Filed April 16, 1938
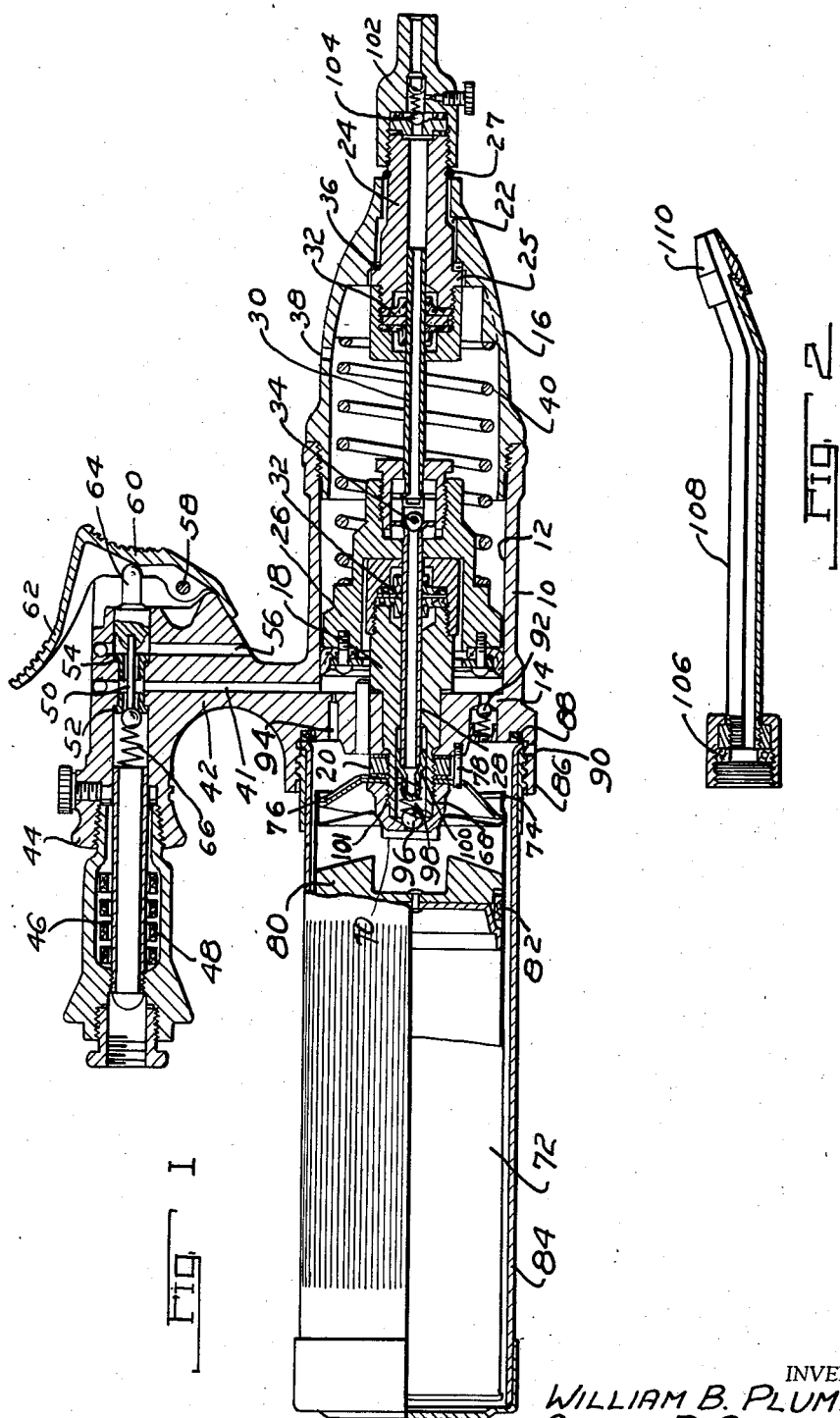
INVENTORS.
WILLIAM B. PLUMMER
BY OTTO B. CLARK.
McConkey Dawson & Booth
ATTORNEYS.

Patented June 25, 1940

2,205,667

UNITED STATES PATENT OFFICE 2,205,667

LUBRICATING DEVICE

William B. Plummer and Otto B. Clark, Chicago, Ill., assignors, by mesne assignments, to Stewart-Warner Corporation, Chicago, Ill., a corporation of Virginia Application April 16, 1938, Serial No. 202,413

17 Claims. (Cl. 221—47.3)

This invention relates to lubricating devices and more particularly to portable power-operated dispensers or grease guns.

One of the objects of the invention is to provide a lubricating device having spaced cylinders receiving connected pistons in which limited lateral movement of one of the elements is permitted to compensate for irregularities in alinement. Preferably one of the cylinders is formed in a member which is movable laterally so that it can move to compensate for misalinement without damaging the piston.

Another object of the invention is to provide a lubricating device including a piston pump and a source of lubricant supply in which communication from the source to the pump is controlled by a valve operated by the pump piston. The valve is preferably a ball check or the like urged toward its seat by a spring engageable with the piston.

Another object of the invention is to provide a lubricating device in which lubricant can be dispensed either at high pressure or low pressure. Preferably the device includes a fluid operated high-pressure pump and a source of supply subjected to fluid pressure to discharge lubricant directly when desired.

Still another object of the invention is to provide a lubricating device including a connector plate for connection with a replaceable lubricant cartridge in which the plate is mounted for yielding movement to permit alinement of the cartridge.

Another object of the invention is to provide a portable lubricating device including a handle arranged to be used either as a side handle or as a pistol grip.

Other objects, advantages and novel features of the invention will be apparent from the following description of the accompanying drawing, in which:

Figure 1 is a central section with parts in elevation of a lubricating device embodying the invention; and Figure 2 is a section with parts in elevation of a nozzle.

The illustrated device includes a body 10 formed with a power cylinder 12 having a head 14 at one end and a removable cap 16 at its opposite end. A member 18 secured to the head 14 by a nut 20 is formed wtih a priming cylinder coaxial with the cylinder 12 and the cap 16 has at its outer end a coaxial bore 22 in which there is mounted a member 24 formed with a high pressure cylinder.

A compound piston is slidably mounted in the body and includes a central enlarged portion 26 fitting in the cylinder 12, a tubular portion 28 fitting in the priming cylinder, and a tubular portion 30 fitting in the high pressure cylinder. Suitable packings 32 pressed inwardly by finger springs are provided in the members 18 and 24 to seal against the tubular pistons 28 and 30. The tubular pistons 28 and 30 are alined and communicating and a check valve 34 is provided seating against one end of the piston 28 to prevent return flow therethrough from the high pressure cylinder to the priming cylinder.

In assembling a device as so far described it is extremely difficult to maintain perfect alinement between the several cylinders and pistons and any irregularity will cause binding and possible breaking of the tubular pistons. According to the present invention this difficulty is overcome by making the member 24 of smaller size than the bore 22 so that it can have limited lateral movement in the bore. The member is secured in the bore by means of an enlarged shoulder 25 engaging the cap 16 adjacent one end of the bore and a split ring 27 connected to the member and engaging the cap at the opposite end of the bore. A resilient washer 36 of rubber or the like is provided between the shoulder 25 and the cap to hold the member 24 yieldingly in place.

With this construction if there is any misalinement in either of the pistons or the cylinders, the member 24 may shift laterally so that the piston 30 will enter it freely without binding and without danger of piston breakage.

The pump is operated by means of compressed air or other suitable fluid under pressure admitted behind the piston 26 to urge it forwardly, a vent 38 being provided in the cap in front of the piston to permit free forward movement thereof. The piston is returned by a suitable spring 40 engaging its forward face and normally urging it rearwardly to the position shown in Figure 1. Fluid is supplied to the cylinder 12 through a passage 41 formed in a suitable handle having a portion 42 extending substantially at right angles to the cylinder 12 and a lateral portion 44 substantially parallel to and spaced from the cylinder. The portion 44 carries a tube 46 surrounded by an oiling wick 48 so that air flowing to the cylinder will carry a small amount of oil sufficient to lubricate the working parts. The air is controlled by a double ended valve 50 having one end arranged to seat at 52 to prevent flow of air to the cylinder and its opposite end arranged to seat at 54 to close an exhaust passage 56. The valve is operated by an angular trigger pivoted at 58 having a portion 60 substantially parallel to the handle portion 42 and an angular portion 62 substantially parallel to the hande portion 44. The trigger portion 60 engages a projection 64 on the valve so that when the trigger is pressed the valve will seat at 54 and open the passage at 52 for admission of fluid to the cylinder, a spring 66 being provided normally to urge the valve in the opposite direction.

In using the device, an operator may grasp the extension 44 in the manner of a side handle, the trigger portion 62 at this time lying adjacent his thumb to be easily depressed thereby. If it is desired to operate the device with a pistol grip, the operator may grasp the handle portion 42 so that the trigger portion 60 may be conveniently depressed by his fingers.

Lubricant is supplied to the priming cylinder through a connector stud 68 secured to the end of the member 18 and formed for sealing engagement around an outlet opening 70 in a replaceable lubricant cartridge 72. A connector plate 74 is clamped between the stud 68 and the nut 20, a resilient washer of rubber or the like 76 preferably being provided therebetween to permit yielding wobbling movement of the plate. The plate may be prevented from turning by a pin 78 secured to the head 14 and projecting through an opening in the plate. The cartridge is provided at its end with a series of lugs for forming a bayonet type connection with the plate in the manner more particularly described and claimed in the patent to Dodge No. 1,987,002. A suitable piston 80 having its forward surface shaped to conform to the cartridge end and provided with a packing ring 82 is provided in the cartridge to force the contents thereof through the stud 68 and into the priming cylinder.

The cartridge is enclosed by a housing 84 screw threaded to a flange 86 on the body 10 and sealing against a suitable washer 88 to provide an air tight seal. A bleed opening 90 is preferably provided in the flange 86 to vent any pressure in the casing prior to its removal from the flange.

If there should be any imperfection in the spacing or arrangement of the lugs on the cartridge which engage the connector plate tending to cause the cartridge to occupy a position out of alinement with the casing 84, it might be extremely difficult to secure the casing in place over the cartridge. However, due to the yielding mounting of the connector plate 74, the cartridge may be moved slightly to permit proper alinement thereof with the casing.

The piston 80 is urged forwardly in the cartridge by air under pressure admitted to the casing past a suitable check valve 92 so that the lubricant in the cartridge is normally under pressure tending to discharge it therefrom. Preferably a small bleed opening 94 is provided through the head 14 so that pressure in the casing will gradually be relieved when the device is not in use over a substantial period of time.

Flow of lubricant from the cartridge into the priming cylinder is controlled by a ball check 96 seating adjacent the end of the stud 68 to prevent return flow of lubricant from the priming cylinder to the cartridge. A spring 98 is engageable with the ball check 96 at one end and seats against a cap 100 at its opposite end. The cap 100 having openings 101 therein is slidable in an enlarged outer portion of the priming cylinder and is adapted to receive the end of the priming piston 28. When the parts are in the position shown in Figure 1, the priming piston 28 has engaged the cap 100 and urged it toward the valve 96 to compress the spring 98 so that the valve will be pressed against its seat with a relatively large force. The spring is so designed that the valve seating force is sufficient to prevent flow of lubricant from the cartridge into the priming cylinder under the influence of air pressure. When air is admitted behind the piston 26 to move it forwardly the piston 28 is moved forwardly permitting the cap 100 to move away from the valve to relieve the pressure on spring 98 to permit the valve 96 to unseat. At this time lubricant from the cartridge can flow freely into the priming cylinder to provide a priming charge.

As shown in Figure 1, the member 24 is provided with a discharge nozzle 102 having a forwardly opening check valve 104 and shaped for sealing engagement with a lubricant receiving fitting. This is the nozzle normally employed for high pressure lubricating operations as described hereinafter.

In operation with the parts in the position shown, the passages through the pistons 28 and 30 are normally full of lubricant which has filled the high pressure cylinder. When the trigger is depressed to move valve 50 to open position, air under pressure flows through the passage 40 into the cylinder 12 behind the piston 26, thereby moving the three pistons forwardly simultaneously. Since the check valve 34 prevents reverse flow of lubricant through the passage in the pistons, the lubricant in the high pressure cylinder will be forced out past the check valve 104 under extremely high pressure. At the same time, lubricant will flow from the cartridge into the priming cylinder past the check valve 96 to fill the priming cylinder. When the trigger is released, the valve moves to the position shown in which air in the cylinder 12 flows to atmosphere through the passage 41 and exhaust passage 56 so that the pistons will be returned under the influence of spring 40. At this time, the valves 96 and 104 will seat to prevent reverse flow of lubricant back into the cartridge and the piston 28 will displace lubricant from the priming cylinder through the passage in the pistons and past the check valve 34 into the high pressure cylinder. Thus, each time the trigger is depressed, a charge or "shot" of lubricant under high pressure will be forced through the discharge nozzle.

When it is desired to lubricate universal joints, steering gears or the like, in which very small resistance to lubricant flow is encountered, the lubricant may be dispensed continuously under low pressure by holding the trigger depressed. The first part of this operation is similar to that described above in which the pistons move forwardly to unseat the check valve 96. If the trigger is held depressed, air flowing past the check valve 92 will maintain pressure on lubricant in the cartridge and if the resistance to flow is less than the applied pressure, the lubricant will flow continuously from the cartridge through the passage in the pistons and out the nozzle, this operation continuing as long as the trigger is held depressed.

For use in low pressure dispensing, the high pressure nozzle 102 is preferably replaced by a nozzle of the type shown in Figure 2 which includes a cap 106 to be secured to the member 24 and an elongated open tube 108 terminating in an open nozzle 110. Since this nozzle does not include a check valve and since the passages therein are relatively large, its resistance to lubricant flow will be small so that the lubricant may be dispensed freely under a relatively low pressure.

While one embodiment of the invention has been illustrated and described in detail, it will be understood that many changes might be made therein and it is accordingly not intended to limit the scope of the invention to the exact form shown nor otherwise than by the terms of the appended claims.

What is claimed is:

1. A lubricating device comprising a body formed with a power cylinder, a piston reciprocably mounted in said cylinder, a high pressure piston secured to said first named piston, and a member loosely carried by said body and formed with a high pressure cylinder receiving said high pressure piston, said member being movable laterally of the power cylinder to compensate for imperfect alinement.

2. A lubricating device comprising a body formed with a power cylinder, a piston reciprocably mounted in said cylinder, a high pressure piston secured to said first named piston, said body having a bore therein substantially in alinement with the high pressure piston, a member mounted in said bore and fitting loosely therein to provide for limited lateral movement and formed with a high pressure cylinder receiving said high pressure piston, and means on said member engaging the body adjacent opposite ends of the bore, one of said means including a yielding packing.

3. A lubricating device comprising a body formed with a power cylinder, a priming cylinder and a high pressure cylinder substantially in alinement, a compound piston including portions fitting in said cylinders respectively, and means connecting one of said cylinders to the body for limited lateral movement to compensate for irregularities in alinement.

4. A lubricating device comprising a body formed with a power cylinder, a priming cylinder and a high pressure cylinder substantially in alinement, a compound piston including portions fitting in said cylinders respectively, means to supply lubricant to the priming cylinder, a check valve between the priming cylinder and the supply means, and a spring engaging said check valve and the piston whereby the check valve will be unseated when the piston moves in one direction and will be seated to resist flow of lubricant into the priming cylinder when the piston is moved in the other direction.

5. A lubricating device comprising a body formed with a power cylinder, a priming cylinder and a high pressure cylinder substantially in alinement, a compound piston including portions fitting in said cylinders respectively, means to supply lubricant to the priming cylinder, said compound piston having a passage therethrough for flow of lubricant from the priming cylinder to the high pressure cylinder, and check valves in the priming and high pressure cylinders and in said passage to prevent return flow of lubricant toward said supply means, the check valve in the priming cylinder being urged against its seat by a spring engaging the piston whereby the tension on the spring will be varied as the piston moves.

6. A lubricating device comprising a body formed with a power cylinder, a priming cylinder and a high pressure cylinder substantially in alinement, a compound piston including portions fitting in said cylinders respectively, means connecting the high pressure cylinder to the body for limited lateral movement to compensate for irregularities in alinement, a check valve adjacent the outer end of the priming cylinder, and a spring engaging said valve and the piston to urge the valve toward its seat with a pressure varying as the piston moves.

7. A lubricating device comprising a source of lubricant, means forming a cylinder communicating with said source, a plunger slidable in the cylinder, a check valve in the cylinder to prevent flow of lubricant from the cylinder to the source, and a spring engaging said valve at one end and engageable at its other end with the plunger whereby the spring pressure against the valve will be varied as the plunger moves.

8. A lubricating device comprising a source of lubricant, means forming a cylinder communicating with said source, means forming a high pressure cylinder spaced from said first named cylinder, hollow communicating pistons slidable in said cylinders, a valve in said first named cylinder preventing return flow therefrom to the source, and a spring engageable with said valve and the plunger to urge the valve closed as the plunger moves into the first named cylinder.

9. A lubricating device comprising means forming a cylinder, a plunger entering one end of the cylinder and slidable therein, a connector stud secured to the other end of the cylinder for sealing engagement with a lubricant supply cartridge, a check valve in said cylinder to prevent flow of lubricant therefrom to the supply cartridge, a spring urging said valve closed and engaging said plunger whereby its force will be varied as the plunger moves, a connector plate movably carried by said means adjacent the stud for attachment to the cartridge, and yielding means engaging the plate and said means yieldingly to hold the plate in alinement.

10. A lubricating device comprising means forming a cylinder, a plunger entering one end of the cylinder and slidable therein, a connector stud secured to the other end of the cylinder for sealing engagement with a lubricant supply cartridge, a connector plate movably carried by said means adjacent the stud for attachment to the cartridge, and yielding means engaging the plate and said means yieldingly to hold the plate in alinement.

11. A lubricating device comprising a body formed with a power cylinder, a power piston in said cylinder, means forming a lubricant pump connected to be operated by said piston, a handle secured to said body extending laterally therefrom and having a passage for conducting actuating fluid to said cylinder, an extension on said handle lying substantially parallel to said cylinder whereby the body can be supported by gripping either the handle or the extension, a valve mounted in the handle adjacent the extension and a pivotally mounted control trigger for the valve having a portion lying substantially parallel to the handle and another portion lying substantially parallel to the extension.

12. A lubricating device comprising means forming a pair of spaced alined cylinders, intercommunicating hollow pistons slidable in said cylinders, a source of lubricant under relatively low pressure communicating with one of said cylinders, a discharge nozzle connected to the other cylinder, lubricant being discharged under relatively high pressure through said nozzle when the pistons move toward said other cylinder, a valve controlling communication between said one cylinder and said source, and resilient means connecting the pistons to said valve to urge the valve closed when the pistons move toward said one cylinder and to permit the valve to open freely when the pistons move toward said one cylinder.

13. A lubricating device comprising means forming a pair of spaced alined cylinders, intercommunicating hollow pistons slidable in said cylinders, a source of lubricant under relatively low pressure communicating with one of said cylinders, a discharge nozzle connected to the other cylinder, lubricant being discharged under relatively high pressure through said nozzle when the pistons move toward said other cylinder, means forming a valve seat adjacent the inlet end of said one cylinder, a ball valve engageable with said seat, and a spring lying between the ball valve and the adjacent end of the pistons to urge the valve against its seat when the pistons move toward the valve, the pressure on said valve being relieved when the pistons move away from the valve.

14. A lubricating device comprising a body formed with a power cylinder, means forming a high pressure cylinder at the forward end of the power cylinder and a priming cylinder at the rear end of the power cylinder, a compound piston including portions slidable in said cylinders respectively, said piston having a passage for lubricant therethrough, a lubricant supply cartridge communicating with the priming cylinder, means to supply fluid to the power cylinder to the rear of the piston to urge the piston forwardly and to the cartridge to urge lubricant therefrom into the priming cylinder, means to urge the piston rearwardly, and valve means controlling communication between the cartridge and the priming cylinder and operated by the piston to restrict communication when the piston is moved rearwardly and to provide free communication when the piston is moved forwardly.

15. A lubricating device comprising a body formed with a power cylinder, means forming a high pressure cylinder at the forward end of the power cylinder and a priming cylinder at the rear end of the power cylinder, a compound piston including portions slidable in said cylinders respectively, said piston having a passage for lubricant therethrough, a lubricant supply cartridge communicating with the priming cylinder, means to supply fluid to the power cylinder to the rear of the piston to urge the piston forwardly and to the cartridge to urge lubricant therefrom into the priming cylinder, means to urge the piston rearwardly, a forwardly opening check valve between the priming cylinder and the cartridge, and a spring engageable with the piston and with said check valve to urge the check valve closed when the piston is moved rearwardly, the piston moving away from the spring when it moves forwardly to relieve the closing pressure on the check valve.

16. A lubricating device comprising a source of lubricant supply, means forming a cylinder communicating with said source, a plunger slidable in said cylinder and normally occupying a position adjacent the source, a check valve in the cylinder to prevent flow of lubricant from the cylinder to the source, and a spring engaging the valve and the end of the plunger adjacent the source whereby the valve will be seated when the plunger is in its normal position and will be unseated when the plunger moves away from its normal position.

17. A lubricating device comprising a source of lubricant supply under pressure, means forming a cylinder communicating with said source, a plunger slidable in said cylinder and normally occupying a position adjacent the source, a check valve in the cylinder to prevent flow of lubricant from the cylinder to the source, and a spring engaging the valve and the end of the plunger adjacent the source whereby the valve will be seated when the plunger is in its normal position to resist flow of lubricant from the source into the cylinder and will be unseated when the plunger moves away from its normal position so that lubricant may flow freely from the source into the cylinder.

WILLIAM B. PLUMMER.
OTTO B. CLARK.